United States Patent

Nagaki

(10) Patent No.: US 6,738,710 B2
(45) Date of Patent: *May 18, 2004

(54) NAVIGATION SYSTEM

(75) Inventor: Koichi Nagaki, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/735,514

(22) Filed: Dec. 14, 2000

(65) Prior Publication Data

US 2002/0128771 A1 Sep. 12, 2002

(30) Foreign Application Priority Data

Dec. 14, 1999 (JP) ............................................ P11-354864

(51) Int. Cl.⁷ .............................................. G01C 21/26
(52) U.S. Cl. ........................ 701/208; 701/207; 701/209; 340/990; 340/995.12; 340/995.18; 342/357.13
(58) Field of Search ........................ 701/200, 207–213, 701/25, 26, 35; 340/988–990, 995.1, 995.12, 995.14, 995.17, 995.18, 995.19; 342/357.01, 357.06, 357.03

(56) References Cited

U.S. PATENT DOCUMENTS

| | | | | |
|---|---|---|---|---|
| 5,262,774 A | * | 11/1993 | Kuwahara et al. | 340/988 |
| 5,396,431 A | * | 3/1995 | Shimizu et al. | 701/207 |
| 5,471,636 A | * | 11/1995 | Hauck | 717/100 |
| 5,544,087 A | * | 8/1996 | Nakajuma et al. | 701/209 |
| 5,614,895 A | * | 3/1997 | Ohomori et al. | 340/995.15 |
| 5,689,252 A | * | 11/1997 | Ayanoglu et al. | 340/991 |
| 5,790,975 A | * | 8/1998 | Kashiwazaki et al. | 340/990 |
| 5,944,768 A | * | 8/1999 | Ito et al. | 701/200 |
| 6,009,363 A | * | 12/1999 | Beckert et al. | 307/10.7 |
| 6,076,041 A | * | 6/2000 | Watanabe | 701/201 |
| 6,169,956 B1 | * | 1/2001 | Morimoto et al. | 701/209 |
| 6,208,918 B1 | * | 3/2001 | Ando et al. | 701/35 |
| 6,246,958 B1 | * | 6/2001 | Hirono | 340/990 |
| 6,324,471 B1 | * | 11/2001 | Katayama et al. | 340/988 |
| 6,324,599 B1 | * | 11/2001 | Zhou et al. | 710/26 |
| 6,330,858 B1 | * | 12/2001 | McDonough et al. | 101/208 |
| 6,351,706 B1 | * | 2/2002 | Morimoto et al. | 340/995 |
| 6,448,908 B1 | * | 9/2002 | Hijikata | 340/995.19 |
| 2001/0004724 A1 | * | 6/2001 | Nagaki | 701/208 |

FOREIGN PATENT DOCUMENTS

| | | |
|---|---|---|
| DE | 198 03 253 A 1 | 8/1998 |
| DE | 197 46 597 A 1 | 4/1999 |
| JP | 6-131292 | 5/1994 |

* cited by examiner

Primary Examiner—Jacques H. Louis-Jacques
(74) Attorney, Agent, or Firm—Morgan, Lewis & Bockius LLP

(57) ABSTRACT

A navigation system is provided with: a present position detecting device (16, 17) for detecting a present position; a first memory device (14) for reading map data from a record medium (1) in which the map data is recorded; a second memory device (15) of non-volatile type, to which the map data can be written and from which the map data can be read; a navigation controlling device (11) for controlling a navigation operation in correspondence with the detected present position by using the map data, and sending a transfer command to transfer the map data from the first memory device to the second memory device at a predetermined timing; and a transfer interface (30) for controlling an operation of reading the map data from the record medium by the first memory device and an operation of transferring the map data to the second memory device, in accordance with the sent transfer command.

20 Claims, 9 Drawing Sheets

FIG. 3

| DATA ORDER | BLOCK MAP DATA NAME |
|---|---|
| 1 | BLOCK (1, 1) |
| 2 | BLOCK (2, 1) |
| 3 | BLOCK (3, 1) |
| ⋮ | ⋮ |
| M | BLOCK (M, 1) |
| M+1 | BLOCK (1, 2) |
| M+2 | BLOCK (2, 2) |
| M+3 | BLOCK (3, 2) |
| ⋮ | ⋮ |
| 2M+1 | BLOCK (1, 3) |
| 2M+2 | BLOCK (2, 3) |
| 2M+3 | BLOCK (3, 3) |
| ⋮ | ⋮ |
| M(N−1)+1 | BLOCK (1, N) |
| ⋮ | ⋮ |
| M−N | BLOCK (M, N) |

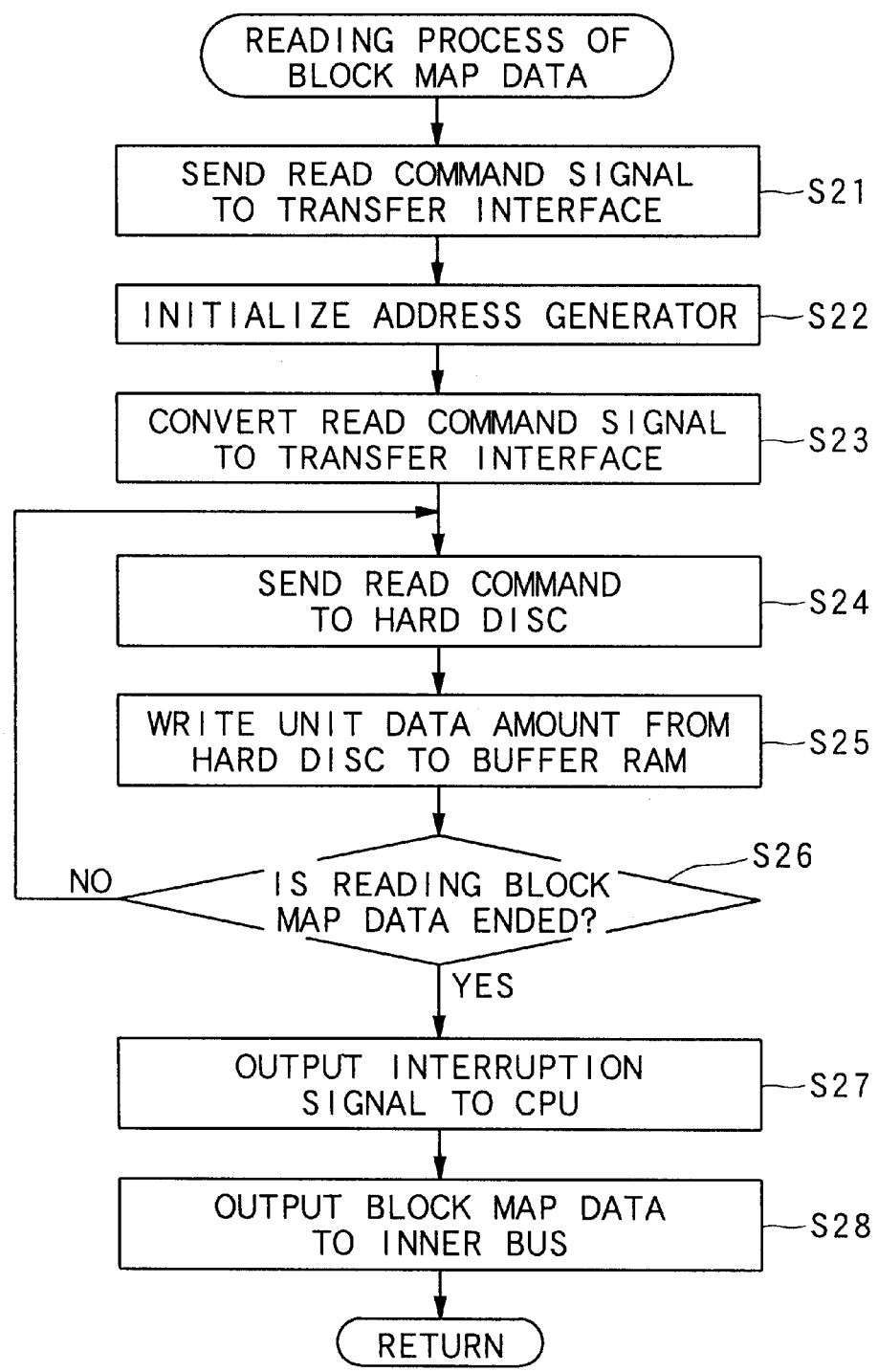

NAVIGATION SYSTEM

BACKGROUND OF THE INVENTION

1. Field of the Invention

The present invention relates to a navigation system for carrying out a navigation operation by using map data recorded in a record medium, and more particularly relates to a navigation system having a hard disc for storing the map data.

2. Description of the Related Art

There is a navigation system, which has a DVD-ROM (DVD—Read Only Memory) drive or a CD-ROM (Compact Disc—Read Only Memory) drive, reads map data stored in a DVD-ROM or a CD-ROM as a record medium, and carries out a navigation operation. When carrying out the navigation operation, the navigation system detects a self-car position, reads the map data around the car from the record medium, and then displays a map picture generated on the basis of the map data together with a mark indicative of the self-car position on a display screen.

By the way, a record medium such as a DVD-ROM or the like is available in which music data and video data are recorded in a format of DVD-Video or DVD-Audio. Thus, it is desired to perform a reproduction of such a record medium during a car driving operation. However, the above-mentioned navigation system requires that the record medium in which the map data is stored is always inserted in the DVD-ROM drive or the like during the navigation operation. Namely, the DVD-ROM drive or the like is occupied by the record medium for the navigation operation. Hence, it is difficult to use the DVD-ROM drive or the like for another purpose such as a reproduction of the music data or video data.

On the other hand, it may be considered that the navigation system is equipped with, for example, a hard disc, as a non-volatile memory having a large capacity, besides the record medium. If the entire data of the DVD-ROM or the like is perfectly installed in the hard disc, and then the map data is read from the hard disc at a time of the navigation operation, the DVD-ROM or the like can be used for another purpose. Also, since an access speed for the hard disc is very fast, this has a merit from the viewpoint of a fast drawing on a display screen.

However, it takes a considerable time to carry out an installation operation from the record medium, such as the DVD-ROM or the like, to the hard disc. Also, this operation is troublesome for a user. Moreover, the DVD-ROM has a large capacity. For example, it has 4.7 Gigabytes in a case of a one-surface one-layer type, and it has 8.5 Gigabytes in a case of a one-surface two-layer type. Thus, correspondingly to a storage capacity or a memory capacity thereof, it is necessary to reserve a large storage area in the hard disc. Hence, when the hard disc is used for another purpose, this brings about enormous uselessness.

On the other hand, it may be considered that the map data is transferred from the record medium, such as the DVD-ROM or the like, to the hard disc during the navigation operation as the occasion demands, the processing performance of the navigation system is extremely dropped. That is, if a CPU of the navigation system always controls the transferring process, its process load becomes excessive. For example, a trouble is induced in the displaying process at a time of the navigation operation. Moreover, if the transfer is once carried out through a buffer, an inner bus is occupied, so that a trouble is induced even in another data transferring operation. In this way, the process of transferring the map data to the hard disc as mentioned above cannot be freely carried out because of a restriction or limitation on the process in the navigation system, which is a problem.

SUMMARY OF THE INVENTION

The present invention is proposed in view of the above mentioned problems. It is therefore an object of the present invention to provide a navigation system, which has a hard disc and can automatically transfer map data required for the navigation operation to the hard disc, without applying an excessive load on a CPU and without giving a bad influence on another process.

The above object of the present invention can be achieved by a first navigation system of the present invention provided with: a present position detecting device for detecting a present position; a first memory device for reading map data from a record medium in which the map data is recorded; a second memory device of non-volatile type, to which the map data can be written and from which the map data can be read; a navigation controlling device for controlling a navigation operation in correspondence with the detected present position by using the map data, and sending a transfer command to transfer the map data from the first memory device to the second memory device at a predetermined timing; and a transfer interface for controlling an operation of reading the map data from the record medium by the first memory device and an operation of transferring the map data to the second memory device, in accordance with the sent transfer command.

According to the first navigation system of the present invention, the navigation system is provided with the first memory device using the DVD-ROM, CD-ROM or the like, and the second memory device such as the hard disc or the like. The navigation controlling device sends the transfer command of the map data to the transfer interface at the predetermined timing while controlling the navigation operation in correspondence with the present position such as a self-car position. The transfer interface controls in accordance with the received transfer command so that the map data is read from the record medium by the first memory device, and is then transferred to the second memory device.

Therefore, in case that the map data is transferred to the second memory device, even if the record medium is not always set in the first memory device, the navigation operation can be continued. Further, since the map data is automatically transferred by the transfer command, and since it is not necessary for the navigation controlling device such as a CPU to intervene in the transferring process itself afterward, it is possible not to increase the processing load on the navigation controlling device and perform the processes necessary for the navigation operation smoothly. Thus, it is possible to efficiently use the map data by performing the transferring process without influencing the process of the navigation system.

In one aspect of the first navigation system of the present invention, the map data read from the record medium by the first memory device is sent through the transfer interface to the second memory.

According to this aspect, upon transferring the map data, the transfer interface obtains the map data read from the first memory device and transfers it as it is to the second memory device. Thus, since the map data is not passed through the internal bus etc., and is transferred by the transfer interface, the input and output of the data through the internal bus etc., required for another process is not interrupted.

In another aspect of the first navigation system of the present invention, the transfer interface comprises: a command converting device for converting a type of the sent transfer command to thereby generate a command, which is identifiable by the first memory device and the second memory device; and a transfer controlling device for controlling the operation of transferring the map data from the first memory device to the second memory device, on the basis of the generated command.

According to this aspect, upon transferring the map data, the transfer interface converts the type or format of the received transfer command and thereby generates the command based on the predetermined interface standard. Then, the transfer interface reads the map data from the fist memory device in accordance with this command, and then transfers and stores it into the second memory device. Thus, since the navigation controlling device does not have to control each of the memory devices individually and since the transfer command is automatically converted into the desired command, the load of the process accompanied by the navigation control is further reduced.

In this aspect of having the command converting device, the transfer interface may be further provided with a buffer memory device for transiently storing the map data, and the transfer controlling device may control the operation of transferring the map data from the first memory device to the buffer memory device and an operation of transferring the map data from the buffer memory device to the second memory device, on the basis of the generated command.

By constituting in this manner, upon transferring the map data, the transfer interface reads the map data from the first memory device and transiently stores it in the buffer memory device. In succession, the transfer interface reads the map data from the buffer memory device, and transfers and stores it to the second memory device. Since the map data is transferred through the buffer memory device, it is possible to transfer the map data surely at the desirable timing.

In the aspect of having the command converting device, the transfer controlling device may divide the map data into a plurality of unit data each comprising a predetermined unit data amount and transfers the map data by repeating an operation of transferring the unit data by a plurality of times.

By constituting in this manner, the transfer interface device can be connect with the first memory device and the second memory device by using a general interface standard, so that it is possible to easily control the whole transfer data amount by changing the number of times of the transferring operation of transferring the unit data.

In the aspect of having the command converting device, the command converting device may generate a plurality of commands by converting a type of the sent transfer command.

By constituting in this manner, since a plurality of commands are generated in response to the transfer command and since the transferring operation of the first memory device and the second memory device is controlled by those commands, it is not necessary for the navigation controlling device to instruct detailed processes in the transferring operation individually. Thus, the processes can be simplified.

In the aspect of having the command converting device in which the map data is divided into a plurality of unit data, the predetermined unit data amount may be substantially equal to a storage capacity of the buffer memory device.

By constituting in this manner, since the transfer interface controls the transferring operation by using the buffer memory device having the storage capacity substantially equal to the unit data amount, it is possible to improve the cost reduction by limiting the storage capacity of the buffer memory to the minimum level.

In the aspect of having the command converting device and the buffer memory device, the transfer interface may be further provided with an address generating device for generating an address for the transfer controlling device to access the buffer memory device.

By constituting in this manner, when the transfer controlling device controls the transferring operation, the predetermined address is generated by the address generating device, so that this address of the buffer memory device is accessed to thereby perform inputting and outputting the transfer data. Thus, it is enough that the transfer controlling device informs the address generating device of the presence or absence of the transferring operation and the transfer data amount, and the transferring operation can be simplified by removing the troublesome process such as an address calculation or the like.

In the aspect of having the command converting device, the transfer controlling device may output a signal, which is to identify an end of the operation of transferring the map data, to the navigation controlling device.

By constituting in this manner, at the timing when the transferring operation of the map data by the transfer interface is ended, the predetermined signal such as an interrupt signal etc., from the transfer controlling device is outputted. Then, the navigation controlling device, which has received this predetermined signal, can judge the end of the transferring operation. Therefore, after the navigation controlling device finishes the transferring operation, another process can be immediately performed in succession, so that the navigation operation can be made speedy.

In another aspect of the first navigation system of the present invention, the second memory device is capable of writing and reading the map data at an access speed faster than that of the first memory device.

According to this aspect, since the access speed of the second memory device is higher than that of the first memory device, it is possible to read out the map data from the second memory device for a shorter time period in accordance with the read command after the map data is transferred, so that the speedy navigation operation can be performed.

In this aspect, the second memory device may be provided with a hard disc device.

By constituting in this manner, since the hard disc device is used as the second memory device, it is possible to utilize the second memory device by transferring the map data to the second memory device, which is speedily accessible, which has a large storage capacity and whose flexibility is high.

In another aspect of the first navigation system of the present invention, a plurality of block map data, which are obtained by dividing a whole map for each unit block, are recorded in the record medium, and the transfer interface reads the block map data and transfers the read block map data to the second memory device.

According to this aspect, since the map data recorded in the record medium comprises a set of the block map data as for each unit block, which are obtained by dividing the whole map for each unit block. Then, the transfer interface transfers the respective block map data. Thus, the transfer interface can perform the transferring process of the map data uniformly. Therefore, since the storage capacity of each memory device and the generation of the command may be performed in accordance with a constant pattern, the control can be easily performed.

In this aspect in which the whole map is divided for each unit block, the transfer interface may be further provided with a buffer memory device, which has a storage capacity capable of storing at least one block map data, for transiently storing the block map data.

By constituting in this manner, the transferring process by the transfer interface is performed in such an order that one block map data is read out and is transiently stored in the buffer memory device, and after that, one block map data is read out from the buffer memory device and is then transferred. Thus, it is possible to transfer the map data in the necessary amount by repeating the same transferring operation with respect to each block map data. Hence, the transferring operation can be easily performed, and the storage capacity of the buffer memory device can be restrained.

Also, in the aspect in which the whole map is divided for each unit block, the navigation controlling device may judge whether or not each block map data to be transferred is already stored in the second memory device, and may control the transfer interface to transfer the block map data which is not judged to be stored in the second memory device yet.

By constituting in this manner, when the navigation controlling device transfers the block map data, the presence or absence of the block map data in the second memory device is judged, and, only if the block map data is not stored, the transfer command as for this block map data is sent to the second memory device. Therefore, by avoiding the useless transferring process, it is possible to perform the transferring process speedily.

Also in the aspect in which the whole map is divided for each unit block, the navigation controlling device may control the transfer interface to transfer a plurality of block map data corresponding to a plurality of peripheral unit blocks with respect to one unit block including the present position as a standard.

By constituting in this manner, the navigation controlling device transmits the transfer command as for the block map data corresponding to the unit blocks surrounding the present position with respect to one unit block including the present position as a standard. Therefore, it is possible to transfer the block map data to the second memory device in advance as for the unit blocks where the present position may be positioned in a near future at a high possibility.

Also in the aspect in which the whole map is divided for each unit block, the navigation controlling device may control the transfer interface to transfer a plurality of block map data corresponding to a plurality of unit blocks including an optimal route from the present position to a destination.

By constituting in this manner, when the optimal rout to the desired destination is set, the navigation controlling device transmits the transfer command as for the block map data corresponding to the unit blocks overlapped with the optimal route from the present position to the destination. Thus, it is possible to transfer the block map data in advance to the second memory device as for the unit blocks where the present position may be scheduled to be positioned in the near future.

In another aspect of the first navigation system of the present invention, the navigation controlling device controls the transfer interface to transfer the map data corresponding to a predetermined area defined in accordance with the detected present position.

According to this aspect, the predetermined area is defined in accordance with the present position, which is detected by the present position detecting device, and the map data corresponding to this area is read out. Then, the transfer command is sent by the navigation controlling device at the predetermined timing. Thus, since the transfer target can be limited, it is possible to speedily complete the transferring operation. Further, since the possibility of the transfer becomes the higher with respect to the area where the present position may be positioned in the near future at the higher possibility. Therefore, the usage value of the map data stored in the second memory device is improved.

In another aspect of the first navigation system of the present invention, the navigation controlling device sends the transfer command each time when a movable body, the present position of which is detected, is moved for a predetermined distance.

According to this aspect, the navigation controlling device sends the transfer command to the transfer interface at the timing when the present position is moved for the predetermined distance, and the transferring operation of the map data is performed as described above in accordance with this transfer command. Thus, since the transferring operation can be performed easily in conjunction with the timing approximately when the predetermined area to be the transfer target is changed, it is possible to perform the transferring operation smoothly.

In another aspect of the first navigation system of the present invention, the navigation controlling device sends a read command to read the map data as the transfer command, and the transfer interface reads the map data from the first or second memory device in accordance with the sent read command.

According to this aspect, the navigation controlling device sends the read command to the transfer interface so as to obtain the map data required for the navigation operation for example. The transfer interface, which has received this read command, reads out the necessary map data from the first memory device or the second memory device. Thus, it is possible to commonly use the transfer interface for the reading process without the necessity of another reading device, so that it is possible to perform the comfortable navigation operation by using the map data without introducing the complexity of the whole structure.

The above object of the present invention can be also achieved by a second navigation system provided with: a present position detecting device for detecting a present position; a first memory device for reading map data from a record medium in which the map data is recorded; a second memory device of non-volatile type, to which the map data can be written and from which the map data can be read; a transfer interface for controlling an operation of reading the map data from the record medium by the first memory device or the second memory device, in accordance with a read command to read the map data; and a navigation controlling device for controlling a navigation operation in correspondence with the detected present position by using the map data, which is read under a control of the transfer interface, and sending the read command at a predetermined timing.

According to the second navigation system of the present invention, the navigation controlling device sends the transfer command of the map data to the transfer interface at the predetermined timing while controlling the navigation operation in correspondence with the present position such as a self-car position. The transfer interface controls in accordance with the received transfer command so that the map data is read from the record medium by the first memory device or the second memory device, and the navigation operation is performed by using this read map data for the displaying process or the like, under the control of the navigation controlling device. Therefore, it is possible to perform the navigation operation smoothly while restricting the process load on the navigation controlling device such as a CPU, by obtaining the map data, without performing complex processes by virtue of the read command.

In one aspect of the second navigation system of the present invention, the read command is appended with identification information, which identifies whether or not the map data is to be read from the record medium by the first memory device or the second memory device.

According to this aspect, the identification information is obtained from the read command, and the map data is read from the record medium by the first memory device or the second memory device, which is identified by this identification information. Thus, it is possible to easily identify the memory device from which the map data is to be read, and it is possible to simplify the process of reading the map data even more.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a diagram showing an example of a data structure when the map data is recorded in a DVD-ROM in the embodiment;

FIG. 9 is a flowchart showing a process of reading the block map data from the hard disc in the embodiment.

DETAILED DESCRIPTION OF THE PREFERRED EMBODIMENTS

Preferred embodiments of the present invention will be explained below with reference to the drawings.

Figure 1:
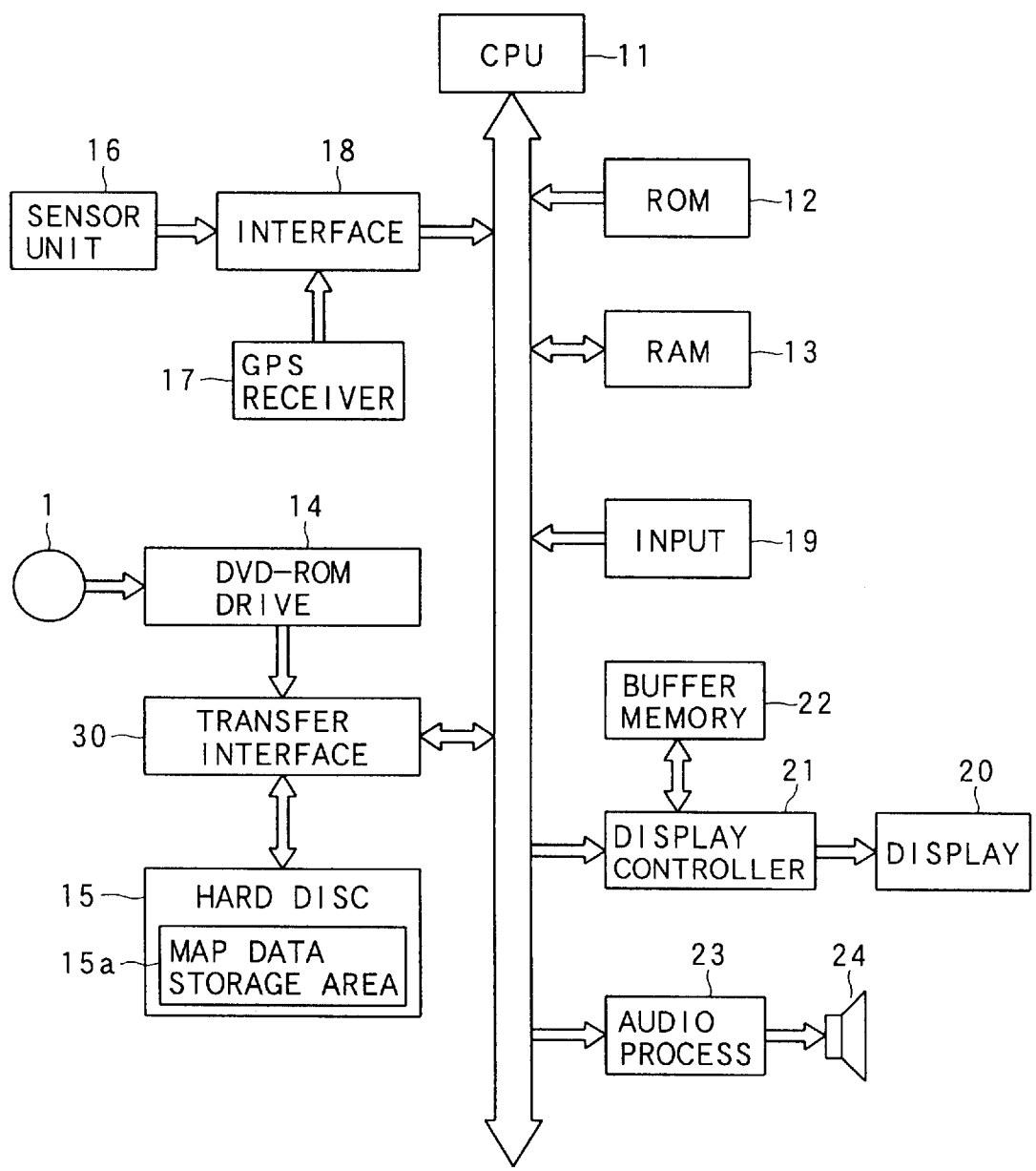
FIG. 1 is a block diagram showing an entire configuration of a navigation system as an embodiment of the present invention.

FIG. 1 is a block diagram showing the entire configuration of a navigation system as the embodiment. The navigation system shown in FIG. 1 is provided with a CPU 11, a ROM 12, a RAM 13, a DVD-ROM drive 14, a hard disc 15, a sensor unit 16, a GPS receiver 17, an interface 18, an input device 19, a display device 20, a display controller 21, a buffer memory 22, an audio process circuit 23, a speaker 24 and a transfer interface 30.

In FIG. 1, the CPU 11 controls the entire operation of the navigation system. The CPU 11 is connected through an inner bus 10 to the respective constitutional elements of the navigation system. At a proper timing, the CPU 11 inputs and outputs data and a control signal through the inner bus 10. The CPU 11 reads a control program stored in the ROM 12 through the inner bus 10. The CPU 11 carries out the control program while transiently storing data, which is currently being processed, into the RAM 13. The CPU 11 functions as one example of a navigation controlling device of the present invention.

The DVD-ROM drive 14 functions as one example of a first memory device of the present invention, contains a DVD-ROM 1 for storing the map data, and carries out an operation of reading the map data. The DVD-ROM 1 is a record medium having a large storage capacity, such as 4.7 Gigabytes in case of the one-surface one layer type and 8.5 Gigabytes in case of the one-surface two-layer type. Pits corresponding to the record data are formed on the DVD-ROM 1. The record data is read by using an optical pickup of the DVD-ROM drive 14.

The DVD-ROM 1 stores therein the map data including road situation data necessary for a navigation operation. Moreover, various related data, such as related facility data, name data and the like are stored while they are correlated with the road situation data. In this embodiment, the entire map is divided into blocks, as meshed unit areas. The map data corresponding to each block is managed as each "block map data". A plurality of block map data are recorded in the DVD-ROM 1.

Figure 2:
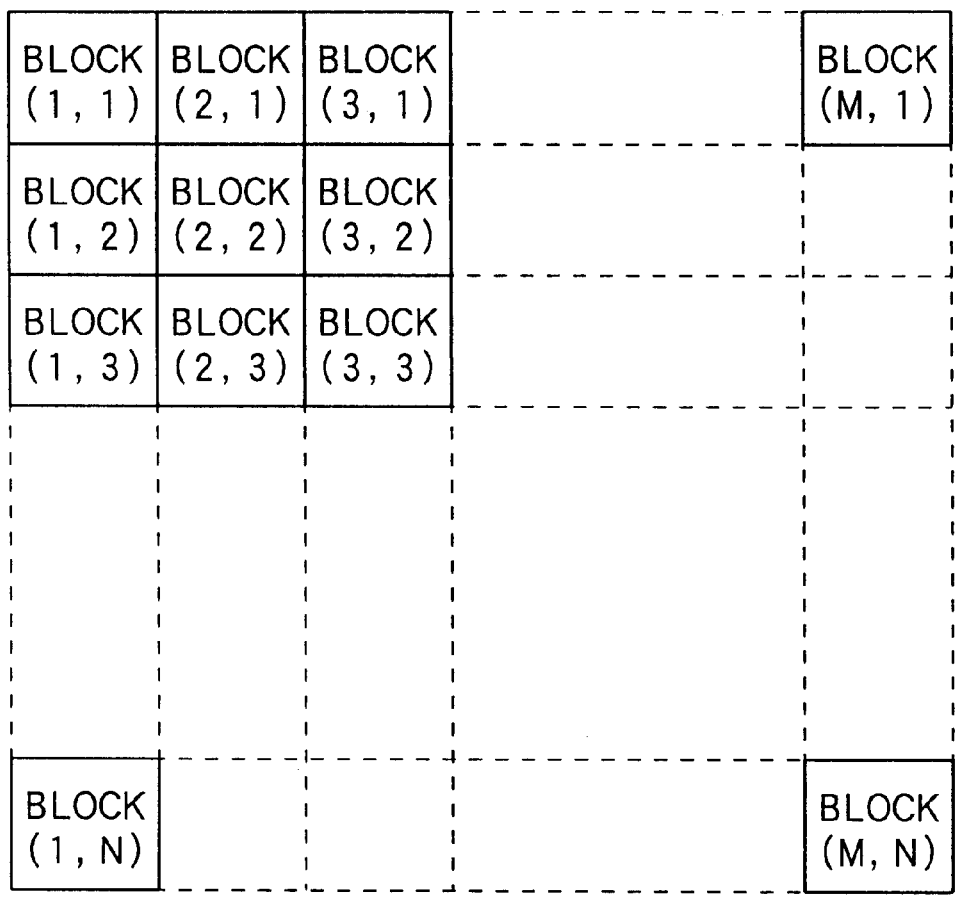
FIG. 2 is a diagram explaining a concept of a block as a division unit of map data in the embodiment.
Figure 2:
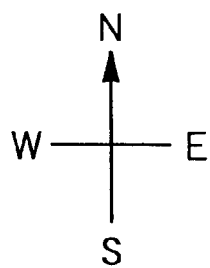

FIG. 2 is a diagram explaining a concept of the block serving as a division unit of the map data in the DVD-ROM 1. As shown in FIG. 2, the map data of the DVD-ROM 1 is divided into respective meshed blocks, such that the entire area on the map is divided into M blocks in the east and west directions and N blocks in the south and north directions, and is managed. In FIG. 2, a block (i, j) is defined as a block at a grid i from the west and at a grid j from the north. A total of M×N blocks having the same shape are gathered from a block (1,1) in the northwest corner to a block (M, N) in the southeast corner, and constitute the entire map data.

In FIG. 2, it is described that the entire area on the map is rectangular, and further, a block at each unit is also a rectangular area. Actually, there may be a case of dealing with a map having a complex entire shape. So, the shapes of the respective blocks are not limited to the same shape. In the following explanation, it is assumed that the respective blocks are the rectangular areas having the same shape, for the purpose of easy illustration. However, the present invention can be applied to a case that the shape of the block is more complex.

FIG. 3 is a diagram showing an example of a data structure when the map data at each block unit shown in FIG. 2 is recorded in the DVD-ROM 1. In FIG. 3, each block map data includes the road situation data of each block and the related data associated with it. A particular name is given to each block map data at each block, so as to be identified. A plurality of block map data are sequentially arranged and recorded in the DVD-ROM 1, as for the respective M×N blocks. A data order of the block map data shown in FIG. 3 is only one example. They may be stored in a data order different from it. Also, they may be stored in a different storage area for each data type of each block.

In FIG. 1 again, the hard disc 15 is a non-volatile type memory for reading and writing the various data such as the map data and the like, and functions as one example of a second memory device of the present invention. In this embodiment, the hard disc 15 can be used for many purposes, and can store therein the various data such as music data, video data, an application program and the like. One portion of the hard disc 15 is assigned as a map data storage area 15a, which is as an area for the storage and the transfer of the map data of the DVD-ROM 1 through the transfer interface 30. For example, about 1 to 2 Gigabytes in the hard disc 15 may be assigned to the map data storage area 15a. As the storage capacity of the hard disc 15 becomes the larger, the larger storage capacity may be assigned to the map data storage area 15a. Also, a user may arbitrarily set the storage capacity of the map data storage area 15a. The transfer of the map data to the hard disc 15 will be described later in detail.

The sensor unit 16 is provided with various sensors required to detect a self-car position. Actually, it contains a car speed sensor, a travel distance sensor and an azimuth sensor to detect a travel situation of the car and the like. The GPS receiver 17 receives an electric wave from a GPS (Global Positioning System) satellite, and outputs measurement data. The sensor unit 16 and the GPS receiver 17 function as one example of a self-car position detector, in cooperation with the CPU 11.

The interface 18 carries out an interface operation between (i) the sensor unit 16 and the GPS receiver 17 and (ii) the CPU 11. The CPU 11 obtains the self-car position data, on the basis of the measurement data from the GPS receiver 17 and sensor outputs from the sensor unit 16. This self-car position data is correlated with the above-mentioned map data by the CPU 11, and is corrected by using a map matching process and the like.

The input device 19 is constituted by a key portion mounted on a main body of the navigation system, or a remote controller having a key portion, and sends a signal corresponding to a key input to the CPU 11 in order to carry out a desirable operation in the navigation operation.

The display device 20 is used for the navigation operation, and it is composed of, for example, a CRT, a liquid crystal display or the like. The map data is displayed on the display device 20, in various manners under a control of the display controller 21. The self-car position is displayed as a car mark overlapping with the map data. The display controller 21 generates the display data to be displayed on the display device 20. While transiently storing the display data into the buffer memory 22, the display controller 21 reads the display data from the buffer memory 22 at a proper timing, and outputs and displays it on the display device 20.

The audio process circuit 23 generates a predetermined audio signal under the control of the CPU 11. The audio signal amplified to a proper level by the audio process circuit 23 is outputted as a sound from the speaker 24 to an external portion. As such an audio signal, for example, there is a guidance voice to guide a route for the car.

The transfer interface 30 transfers the map data recorded in the DVD-ROM 1 from the DVD-ROM drive 14 to the map data storage area 15a of the hard disc 15, at the proper timing in the navigation operation, under the control of the CPU 11. Also, under the control of the CPU 11, the transfer interface 30 reads the map data from the DVD-ROM 1 or the hard disc 15, and then outputs it through the inner bus 10 for the displaying process to the display device 20.

Figure 4:
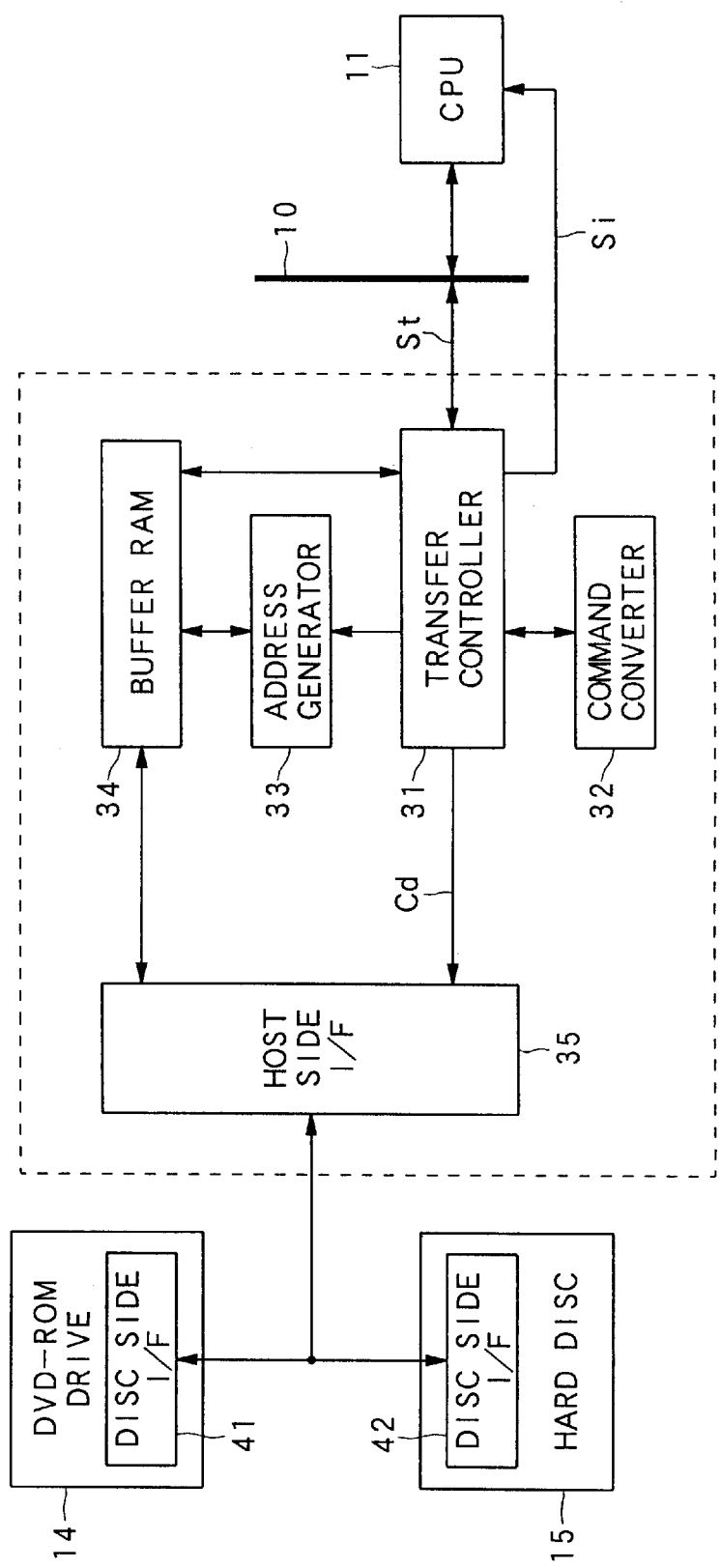
FIG. 4 is a block diagram showing a schematic configuration of a transfer interface in the embodiment.

Here, the schematic configuration of the transfer interface 30 is described with reference to a block diagram in FIG. 4. As shown in FIG. 4, the transfer interface 30 is provided with a transfer controller 31, a command converter 32, an address generator 33, a buffer RAM 34 and a host side interface 35.

The transfer controller 31 serving as one example of a transfer controlling device of the present invention receives a transfer command signal St through the inner bus 10 from the CPU 11, and carries out the interface operation based on this transfer command signal St. As the command signals sent from the CPU 11, in addition to the transfer command signal St for instructing the data transfer from the DVD-ROM drive 14 to the hard disc 15, there are (i) a read command signal for instructing an operation of reading the data to the DVD-ROM drive 14 or the hard disc 15 and (ii) a write command signal for instructing an operation of writing the data to the hard disc 15. Among them, the transfer command signal St for instructing the data transfer from the DVD-ROM drive 14 to the hard disc 15 corresponds to the transfer command of the present invention.

Also, the transfer controller 31 controls the operations of the command converter 32, the address generator 33 and the host side interface 35, and collectively controls the transfer interface 30 as a whole. The transfer controller 31 controls an input and an output of the data between the buffer RAM 34 and the inner bus 10. Moreover, the transfer controller 31 outputs an interruption signal Si to the CPU 11 at a predetermined timing, such as a time of a transfer end or the like.

The command converter 32 serving as one example of a command converting device of the present invention interprets the transfer command signal St, which the transfer controller 31 receives from the CPU 11, and converts it into a command Cd in a type recognizable by the DVD-ROM drive 14 and the hard disc 15, and outputs it to them. Usually, a command group composed of a plurality of commands Cd is generated with respect to one transfer command signal St. For this reason, the command converter 32 transiently stores therein the generated respective commands Cd, and sends them to the DVD-ROM drive 14 or the hard disc 15, at a predetermined timing in accordance with the control of the transfer controller 31. As types of the generated commands Cd, there are a read command for instructing a reading operation, a write command for instructing a writing operation and the like.

The address generator 33 serving as one example of an address generating device of the present invention generates an address when the buffer RAM 34 is accessed, under the control of the transfer controller 31. For example, in the operation of reading the map data from or writing the map data to the buffer RAM 34, the address is sequentially changed in accordance with a data size necessary for one reading operation or writing operation so that the address of the buffer RAM 34 is always kept normal.

The buffer RAM 34 functions as a buffer memory device, to which the data read from the DVD-ROM drive 14 or the hard disc 15 is transiently written and from which the stored data is read at a time of writing the data to the DVD-ROM drive 14 or the hard disc 15. As mentioned above, the access timing of the buffer RAM 34 is determined depending upon the timing when the transfer controller 31 sends the command Cd. The address, at which the data is read from or the data is written, of the buffer RAM 34 is determined by the address generator 33.

Here, it is enough that the buffer RAM 34 has a storage capacity greater than a minimum unit data amount, by which the operation of reading the data from and writing the data to the DVD-ROM drive 14 or the hard disc 15 can be carried out. Actually, it is desirably equal to integer multiple of the minimum unit data amount. However, the storage capacity of the buffer RAM 34 is not limited to this amount. For example, the buffer RAM 34 may have a large storage capacity so as to store one map block, or another buffer memory may be added to the transfer interface 30 to thereby make its storage capacity greater.

The host side interface 35 carries out the interface operation so as to be adapted to the disc side interfaces 41 and 42 owned by the DVD-ROM drive 14 and the hard disc 15, respectively. As shown in FIG. 4, the host side interface 35 of the transfer interface 30, the disc side interface 41 of the DVD-ROM drive 14 and the disc side interface 42 of the hard disc 15 are connected to each other.

For example, the SCSI (Small Computer System Interface) or the ATAPI (AT Attachment Packet Interface) may be used as an interface rule for the connection between the host side interface 35 and the respective disc side interfaces 41 and 42. The SCSI is a standard rule for a connection between a computer and its peripheral device. The ATAPI is a rule to enable a connection of a peripheral device besides the hard disc, on the basis of the IDE (Integrated Drive Electronics) that is a rule to connect the hard disc. In the SCSI and the ATAPI, predetermined commands are defined for the respective connected devices. So, the command Cd may be determined so as to comply with the respective rules.

Next, the process of transferring the map data to the hard disc 15 to be carried out in the navigation system will be described below with reference to FIG. 5 to FIG. 8. Here, the transferring process is described, in such a case that a navigation operation is carried out in a traveling car, which has the DVD-ROM drive 14 loaded with the DVD-ROM 1 for storing the map data.

Figure 5:
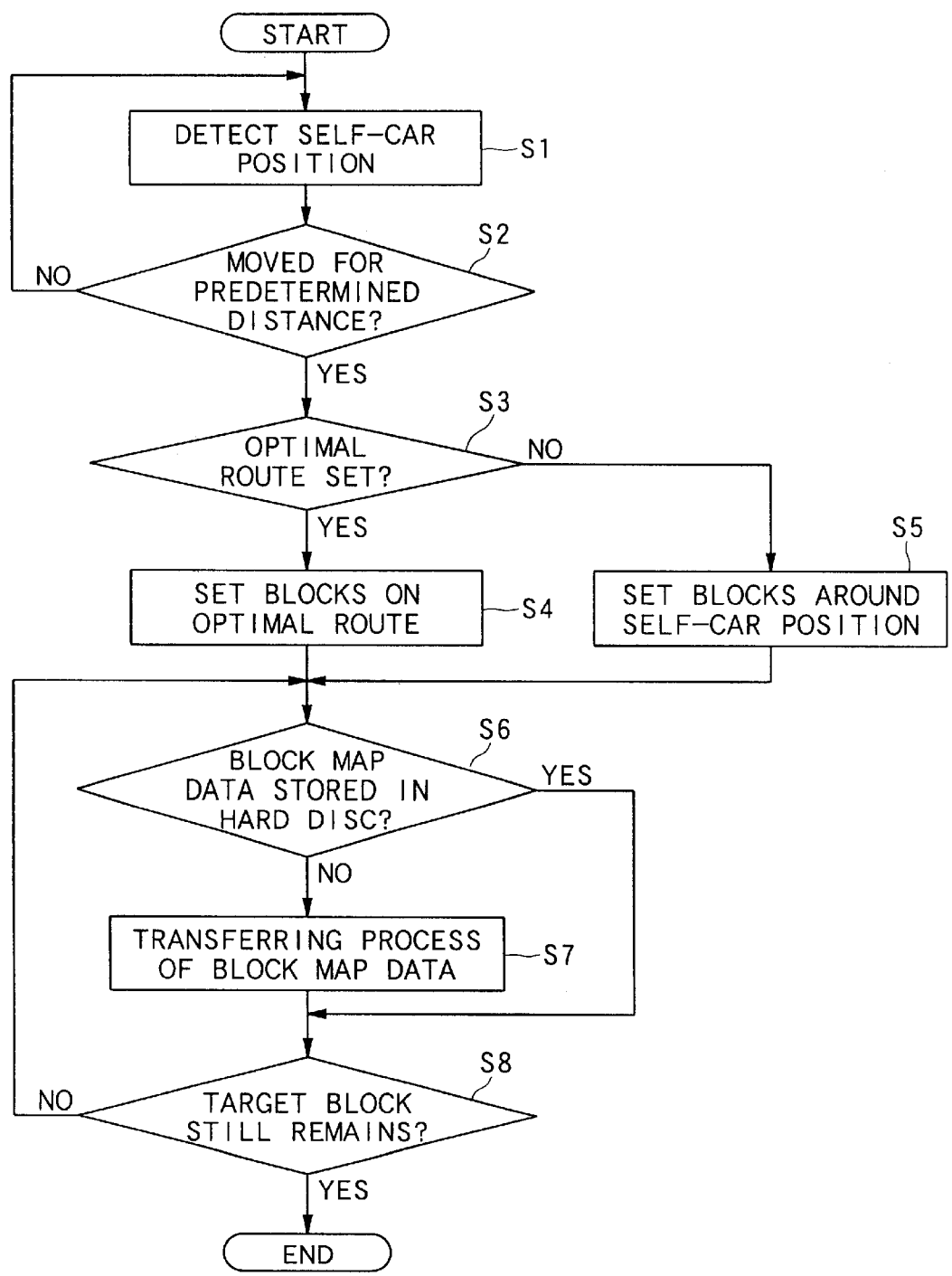
FIG. 5 is a flowchart showing an entire flow of a transferring process in the embodiment.

FIG. 5 is a flowchart showing an entire flow of the transferring process according to this embodiment.

In FIG. 5 at first, the self-car position is detected (step S1). That is, the self-car position data including the latitude and the longitude is determined in accordance with the sensor outputs from the sensor unit 16 and the measurement data from the GPS receiver 17.

Then, a movement distance from a position at which a previous transferring process is carried out is determined in accordance with the self-car position data determined at the step S1, and it is judged whether or not this movement distance exceeds a predetermined distance set in advance (step S2). That is, although the execution timing of the transferring process may be variously set, the transferring process is executed at a timing when the car moves for each predetermined distance, in this embodiment. Besides it, the transferring process may be executed for each movement of the block of the car, or may be executed at a timing of an elapse of a predetermined time period set in advance.

According to the judgment result at the step S2, if the movement distance of the car does not reach the predetermined distance (Step S2: NO), the transferring process is not carried out, and the operational flow returns back to the step SI. On the other hand, if the movement distance of the car reaches the predetermined distance (Step S2: YES), the operational flow proceeds to a step S3.

Then, it is judged whether or not an optimal route for a desirable destination is already set in the navigation system (step S3). In the navigation system, the optimal route may be set in advance by using a predetermined operation of the input device 19, in order to make a user know a route for the desirable destination. According to the judgment result at the step S3, if the optimal route is already set (Step S3: YES), the operational flow proceeds to a step S4. If the optimal route is not set (Step S3: NO), the operational flow proceeds to a step S5.

In this embodiment, a block area targeted for the transferring operation is defined in accordance with the self-car position, in order to reduce a data amount of the map data to be transferred in some degrees and also transfer effective map data having a high usability, when the transfer control is carried out by the transfer control interface 30. As a method of defining such a block area, there are two methods for example. The process at the step S4 corresponds to a case in which the block areas along the optimal route are defined as the transfer target. The process at the step S5 corresponds to a case in which the block areas around the self-car position are defined as the transfer target.

Figure 6:
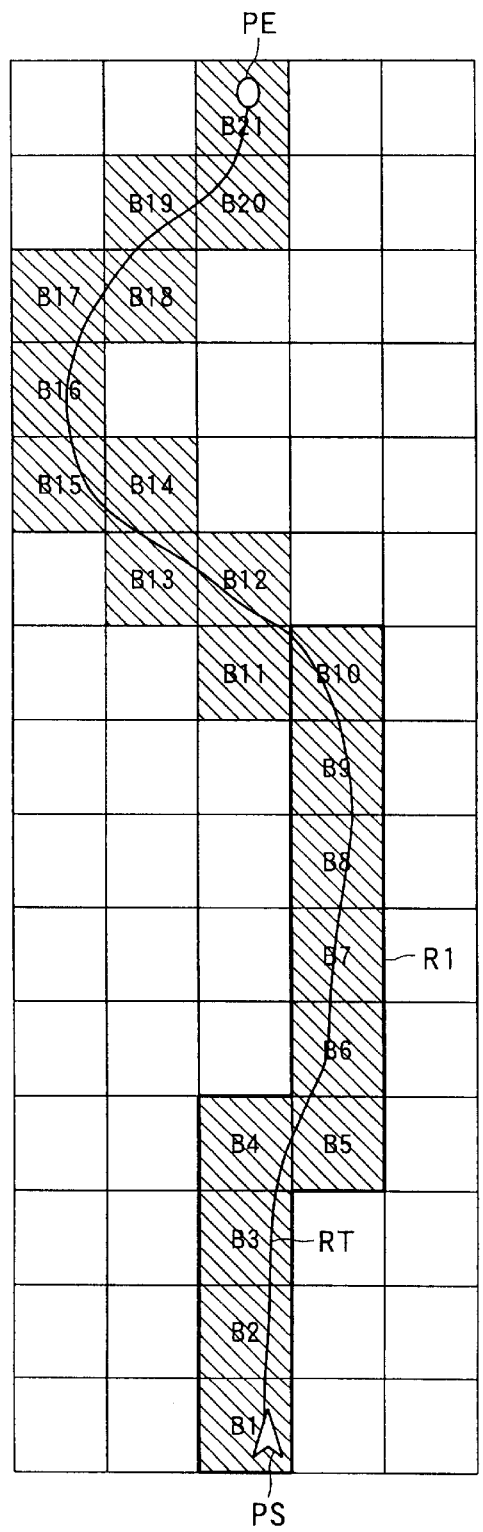
FIG. 6 is a diagram showing a block area along an optimal route targeted for the transferring process in the embodiment.

FIG. 6 is a diagram showing an example of the block areas targeted for the transferring operation at the step S4. For simplicity, a total range of 75 blocks consisting of 5 blocks in the lateral direction and 15 blocks in the longitudinal direction as viewed from the car is considered here.

As shown in FIG. 6, a range overlapped with an optimal route RT set in the navigation system is set as a block area R1 targeted for the transferring operation at the step S4. That is, the optimal route RT from a start position PS to the destination PE is determined in accordance with a predetermined operation. If it is set, 21 blocks from a block B1 including the start position PS, through blocks B2 to B20 in the course of the passage of the optimal route RT, to a block B21 including the destination PE is overlapped with the optimal route RT. The meshed rectangular area is used as the block, as mentioned above. Thus, the block overlapped with the optimal route RT can be determined in accordance with the latitude and the longitude at each point on the optimal route RT.

Here, there may be a case that many blocks exist on the optimal route RT. The number of blocks targeted for one transferring process of transferring the data to the hard disc 15 is limited to a predetermined number because of the limitation on the process time necessary for the transferring process. For example, in a case of FIG. 6, the number of blocks targeted for one transferring process is limited to 10. In this case, an area R1 at the self-car position is defined as the transfer target. As shown in FIG. 6, a total of 10 blocks from blocks B1 to B10 are included in the area R1. The block map data corresponding to each block within the area R1 is sequentially stored into the map data storage area 15a of the hard disc 15 by the transfer interface 30. By the way, the number of blocks included in the area R1 is not limited to 10. It is desirable to determine the number of blocks in an appropriate range with considering the time necessary for the transferring process.

Figure 7:
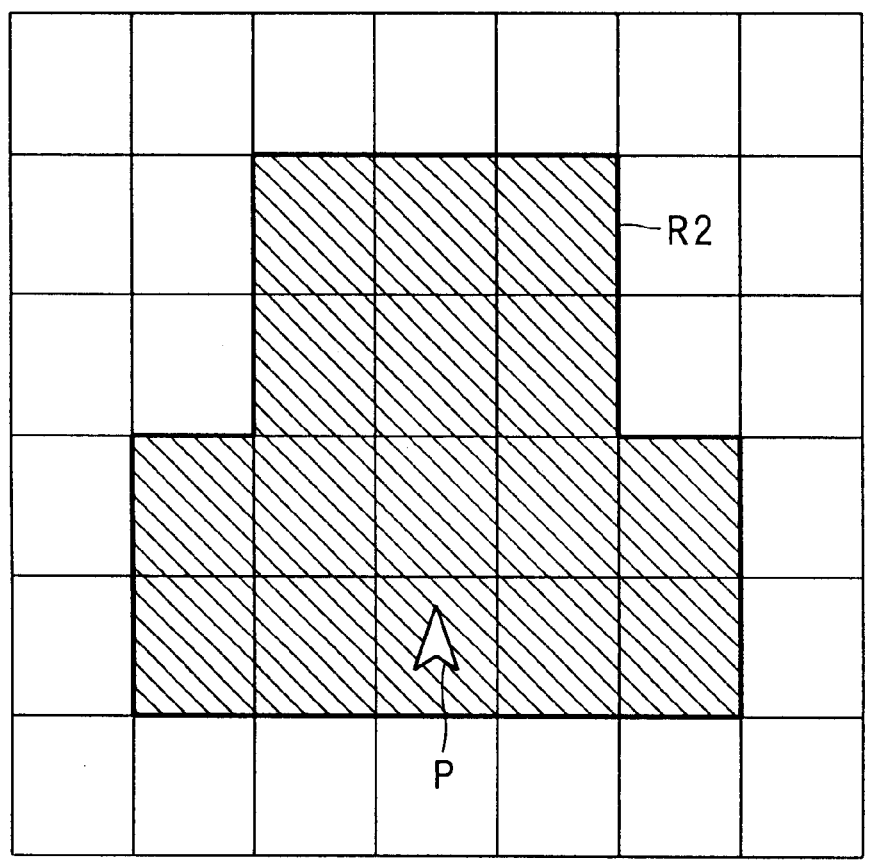
FIG. 7 is a diagram showing a block area around a self-car position targeted for the transferring process in the embodiment.

On the other hand, FIG. 7 is a diagram showing an example of the block area targeted for the transferring operation at the step S5. Here, for simplicity, a total range of 42 blocks consisting of 7 blocks in the lateral direction and 6 blocks in the longitudinal direction as viewed from the car is considered.

In FIG. 7, assuming that the car is located at a self-car position P and also the advancing direction is an upper direction, an area R2 corresponds to the block area targeted for the transferring operation at the step S5. That is, since the optimal route RT is not determined, differently from the case of FIG. 6, the area R2 including 16 blocks in total is relatively widely set on a front side in the advancing direction by considering the possibility of the passage of the car after an elapse of a short time. By the way, the area R2 shown in FIG. 7 can be used even if the advancing direction of the car is any of north, south, east and west directions.

At a time of transferring the data to the hard disc 15, the area R2 can be defined by judging the advancing direction of the car and the block in which the car is included. Then, the block map data corresponding to each block within the area R2 is sequentially stored into the map data storage area 15a of the hard disc 15 by the transfer interface 30 By the way, the shape of the area R2 and the number of blocks are not limited to those shown in FIG. 7. It is possible to set a block area having the proper number of blocks and the proper shape around the self-car position. It is desirable that the block area around the self-car position is properly defined in accordance with a frequency of the transferring process, the size of each block and the like.

In FIG. 5 again, when the process at the step S4 or S5 is ended, it is judged whether or not the block map data corresponding to each block of the above-judged area R1 or R2 is already stored in the hard disc 15 (step S6). Since a plurality of previously transferred block map data are sequentially stored in the map data storage area 15a of the hard disc 15, the presence or absence of a certain block map data can be judged by referring to the block names in turn. Or, it may be designed to provide a management area in the hard disc 15, and write a flag indicative of a presence or absence of a record of each block map data to the management area, and then refer to the flag at a time of the transferring operation. At this time, although it is necessary to read the predetermined area in the hard disc 15, also in this case, it can be read under the control of the transfer interface 30. By the way, the process of reading the data from the hard disc 15 will be described later.

According to the judgment result at the step S6, if the targeted block map data is not stored in the hard disc 15 (Step S6: NO), the transferring process of the block map data is carried out (step S7). On the other hand, if the targeted block map data is already stored in the hard disc 15 (Step S6: YES), it does not carry out the transferring process at the step S5, and the operational flow proceeds to a step S8.

Figure 8:
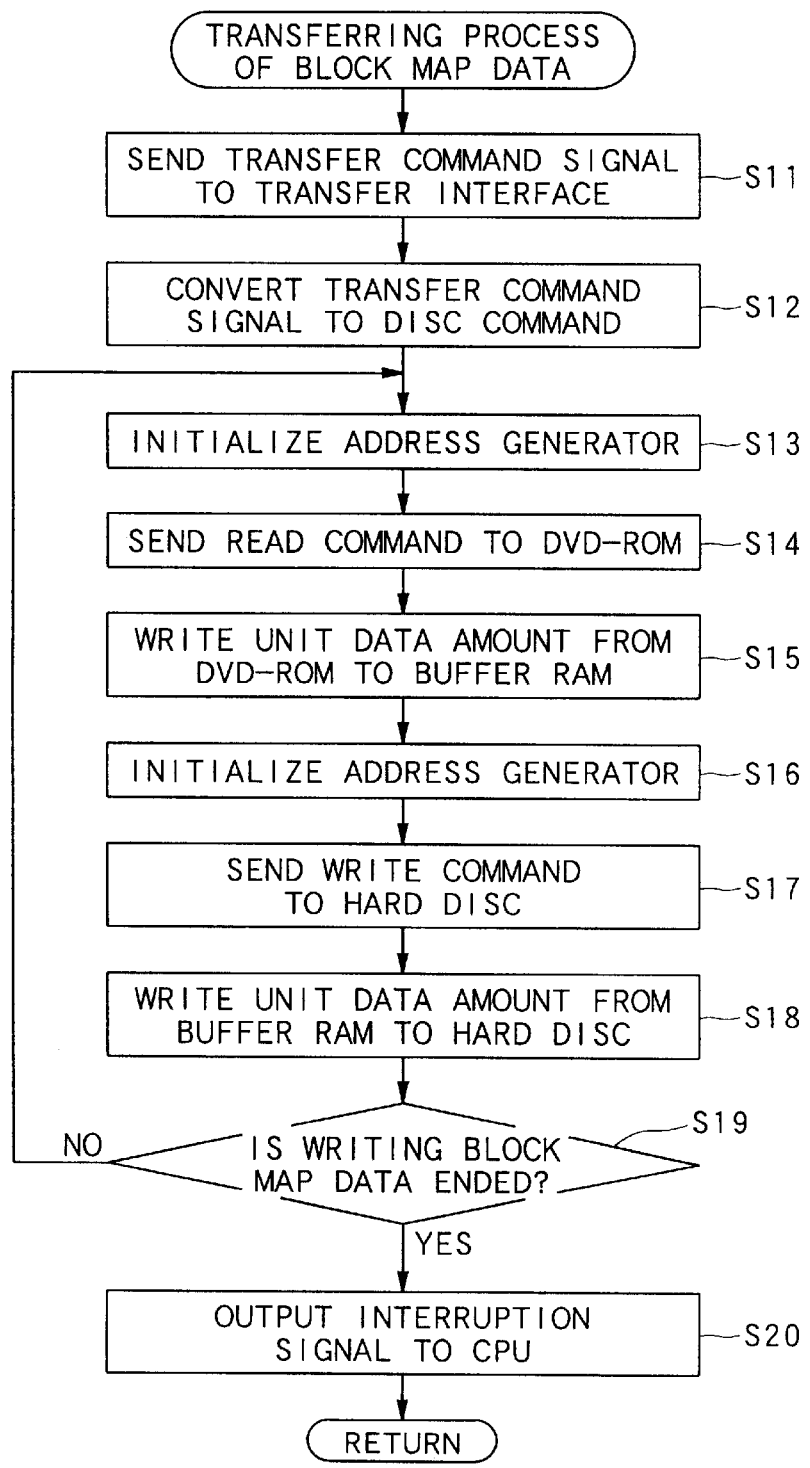
FIG. 8 is a flowchart showing a process of transferring block map data from the DVD-ROM to a hard disc in the embodiment.

The transferring process at the step S7 transfers and stores the block map data of the transfer target block, which is recorded in the DVD-ROM 1, from the DVD-ROM drive 14 to the map data storage area 15a of the hard disc 15, under the control of the transfer interface 30. FIG. 8 is a flowchart explaining the transferring operation of the block map data from the DVD-ROM 1 to the hard disc 15.

In FIG. 8, at first, the CPU 11 sends the transfer command signal St to the transfer interface 30 (step S11). The parameters indicative of a read position of the DVD-ROM 1, a write position of the hard disc 15 and a data size of the data to be transferred are respectively added to the transfer command signal St. The process at the step S7 in FIG. 5 corresponds to the transferring process to one block map data. Thus, the data size in the parameters added at the step S11 may be a data size of one block map data.

Then, the command converter 32 converts the transfer command signal St received at the step S11 into a corresponding command group (step S12). The command group composed of the plurality of commands Cd based on the above-mentioned interface rule is generated in correspondence of the transfer command signal St as mentioned above. Also, the identification information of the DVD-ROM drive 14 or the hard disc 15 is added to each of the commands Cd to accordingly identify the device targeted for the control.

As an example of the command conversion, when block map data A of the DVD-ROM 1 (which is recorded in a logical address 1000 of the DVD-ROM 1, and whose data amount is 2048×32×2 bytes) is transferred to the hard disc 15, the transfer command signal St and the command Cd are concretely described as follows. Here, it is assumed that a storage capacity of the buffer RAM 34 is 2048×32 bytes, a data amount of one logical address block in the DVD-ROM 1 is 2048 bytes, and a data amount of one logical address block in the hard disc 15 is 512 bytes.

At this time, the transfer command signal St outputted by the CPU 11 is the command indicating that "Read the block map data A of 2048×32×2 bytes from the logical address 1000 of the DVD-ROM 1, and write it to the logical address 2000 of the hard disc 15". The transfer command signal St received by the transfer controller 31 is sent to the command converter 32. A plurality of commands Cd are generated as follows.

① Read the map data of 2048×32 bytes (corresponding to 32 blocks) from the logical address 1000 of the DVD-ROM 1.

② Write the map data of 512×128 bytes (corresponding to 128 blocks) to the logical address 2000 of the hard disc 15.

③ Read the map data of 2048×32 bytes (corresponding to 32 blocks) from the logical address 1032 of the DVD-ROM 1.

④ Write the map data of 512×128 bytes (corresponding to 128 blocks) to the logical address 2128 of the hard disc 15.

Those command groups ① to ④ are sent through the transfer controller 31 and the host side interface 35 to the disc side interfaces 41 and 42. The commands Cd are carried out in the order of ①→②→③→④. When all the commands Cd are carried out, the operation of transferring the block map data A from the DVD-ROM 1 to the hard disc 15 is completely ended.

Then, the transfer controller 31 initializes the address generator 33 (step S13). That is, the transfer controller 31 sets a head address of a storage area of the buffer RAM 34 for the address generator 33, and sequentially writes the block map data to be transferred, from the head address of the buffer RAM 34.

Here, the unit data amount transferred in one transferring operation of transferring the data to the hard disc 15 from the DVD-ROM drive 14 is equal to a maximum capacity of the buffer RAM 34. For this reason, when the block map data having a relatively large data amount is transferred, it is necessary that the transferring operation is carried out by a plurality of times. Correspondingly to it, the number of the commands Cd to be generated by the command converter 32 is increased.

In short, if the storage capacity of the buffer RAM 34 is smaller than a data amount of one block map data, a series of operations of reading the data from the DVD-ROM 1 and writing it to the hard disc 15 is carried out by a plurality of times, upon copying one block map data. For this reason, the transferring process is done after the command converter 32 converts the transfer command signal St received from the CPU 11 into the plurality of commands Cd.

Then, a read command for instructing a reading operation corresponding to the unit data amount is sent through the host side interface 35 to the DVD-ROM drive 14 (step S14). A parameter indicative of a read position of the DVD-ROM 1 is added to this read command.

Then, the desirable unit data amount in the block map data targeted for the transferring operation is sent through the disc side interface 41 and the host side interface 35 from the DVD-ROM drive 14, which has received the read command sent at the step S14, and is written to a predetermined address of the buffer RAM 34 (step S15). A write address to the buffer RAM 34 is initialized for each transfer. The writing operation to the buffer RAM 34 starts from the address initialized at the step S13. The map data read from the DVD-ROM 1 is written to a position specified by the write address to the buffer RAM 34. At this time, the block map data targeted for the transferring operation (or, a portion thereof) is in a state that it is held in the buffer RAM 34.

Then, the transfer controller 31 initializes the address generator 33 (step S16). That is, a head address of the storage area for the map data to be read from the buffer RAM 34 is set for the address generator 33. Then, the block map data to be transferred to the hard disc 15 is sequentially read out.

Then, in order to transfer the block map data to the hard disc 15, a write command for instructing a writing operation of writing the unit data amount is sent through the host side interface 35 to the hard disc 15 (step S17). A parameter indicative of a write position to the hard disc 15 is added to this write command.

Then, the unit data amount of the block map data held at a predetermined address of the buffer RAM 34 is read out with respect to the hard disc 15 receiving the write command sent at the step S17, is sent through the disc side interface 42 and the host side interface 35, and is written to a predetermined write position of the map data storage area 15a of the hard disc 15 (step S18).

The operation of reading the data from the buffer RAM 34 starts from the address initialized at the step S13, and the map data is read from the position specified at the read address from the buffer RAM 34.

Then, it is judged whether or not the operation of reading or writing the block map data targeted for the transfer from or to the hard disc 15 is ended (step S19). According to the judgment result, if the operation of reading or writing the block map data is ended (Step S19: YES), the operational flow proceeds to a step S20. If the operation of reading or writing the block map data is not ended (Step S19: NO), the processes at the steps S13 to S19 are repeated. The time when the judgment result at the step S19 becomes "YES" is a time after at least $N^{th}$ operation is performed.

Finally, the transfer controller 31 outputs an interruption signal Si indicative of the end of the transferring process to the CPU 11 (step S20). Since the interruption signal Si is immediately recognized by the CPU 11, it is possible to quickly proceed to the processes on and after the step S8 after the end of the process at the step S7 in FIG. 5. By the way, it may be designed that the transfer controller 31 sets a predetermined flag indicative of the end of the transferring process at the step S20.

In FIG. 5 again, it is judged whether or not the targeted block still remains in the area R1 or the area R2 (step S8). According to the judgment result, if the targeted block still remains (Step S8: YES), the operational flow returns to the step S6, so as to perform the processes at the steps S6 to S8 on the block. On the other hand, if all the targeted blocks are completely transferred (Step S8: NO), the transferring process of FIG. 5 is ended.

The navigation system for carrying out the transferring process according to this embodiment identifies the block in which the self-car position is included. Then, with this block as a standard, the plurality of blocks around the self-car position are used as the transfer target. Then, the transfer interface 30 transfers the block map data recorded in the DVD-ROM 1 from the DVD-ROM drive 14 to the map data storage area 15a of the hard disc 15. In this transferring process, the command converter 32 converts the transfer command signal St received from the CPU 11 into the command group corresponding to the interface rules of the hard disc 15 and the DVD-ROM drive, and transfers the block map data while transiently holding the block map data for each unit data amount in the buffer RAM 34. Accordingly, after the transfer command signal St is sent, it is not necessary for the CPU 11 to intervene in the transferring process. Thus, the map data can be transferred without increasing the process load on the CPU 11. Also, the transfer interface 30 can carry out the transferring process without using the inner bus 10. Hence, a trouble is not induced in another process using the inner bus 10.

The above-mentioned example describes the case in which the transfer interface 30 carries out the process of transferring the map data, in accordance with the transfer command signal St from the CPU 11. However, the CPU 11 can send the read command signal and the write command signal to the transfer interface 30, as mentioned above, in addition to the transfer command signal St. In short, in this embodiment, the access to the hard disc 15 or the DVD-ROM 1 is always carried out through the transfer interface 30. As an example of such a case, a process of reading the map data necessary for a display process or the like during the transferring operation from the hard disc 15 will be described below with reference to FIG. 9.

FIG. 9 is a flowchart showing a process carried out when one block map data is read from the hard disc 15. When the process of FIG. 9 is started, the CPU 11 sends the read command signal to the transfer interface 30 (step S21). Parameters indicative of a read position of the hard disc 15 and a data size of the block map data to be transferred are added to this read command signal.

Then, the transfer controller 31 initializes the address generator 33, similarly to the step S12 (step S22). In succession, the command converter 32 converts the read command signal into a plurality of commands Cd (step S23). So, a command group is generated in accordance with the above-mentioned interface rule. Identification information is added to each of the individual commands Cd.

Next, the read command for instructing an operation for reading the unit data amount is sent through the host side interface 35 to the hard disc 15 (step S24). A parameter indicative of a read position of the hard disc 15 is added to this read command.

Then, the map data storage area 15a of the hard disc 15, which has received the read command sent at the step S24, is accessed (step S25). A desirable unit data amount of the block map data required for the navigation operation is sent through the disc side interface 42 and the host side interface 35, and is written to a predetermined address of the buffer RAM 34. An address given to the buffer RAM 34 by the address generator 33 is similar to that at the step S15 or the step S18.

Then, it is judged whether or not the operation of reading the necessary block map data from the hard disc 15 is ended (step S26). According to the judgment result, if the operation of reading the block map data is ended (Step S26: YES), the operational flow proceeds to a step S27. If the operation of reading the block map data is not ended (Step S26: NO), the processes at the steps S24 to S26 are repeated. By the way, when the judgment result at the step S26 becomes "YES", the necessary one block map data is stored in the buffer RAM 34.

Then, the transfer controller 31 outputs the interruption signal Si indicative of the end of the transferring process to the CPU 11 (step S27). Since the interruption signal Si is immediately recognized by the CPU 11, the operational flow can quickly proceed to a preparation for a next process. By the way, the transfer controller 31 may set the predetermined flag indicative of the end of the transferring process.

Finally, the block map data stored in the buffer RAM 34 is outputted to the inner bus 10 (step S28). After that, there may be a case that this block map data is transferred to the RAM 13 and is then used for the process in the CPU 11 or that this block map data is transferred to the display controller 21 and is then targeted for the display process.

The example of FIG. 9 describes the case when the block map data is read from the hard disc 15. However, the block map data recorded in the DVD-ROM 1 may be read from the DVD-ROM drive 14. For example, when the necessary block map data is not stored in the map data storage area 15a of the hard disc 15, it may be read from the DVD-ROM drive 14. In this case, at the step S23, the identification information of the DVD-ROM drive 14 may be added to each command Cd.

The judgment that the map data is not stored in the map data storage area 15a of the hard disc 15 is done by the CPU 11. The CPU 11 reads a directory (i.e., the management information) of the hard disc 15 through the transfer interface 30, and accordingly judges whether or not the necessary block map data is stored in the hard disc 15. If the block map data is not stored in the hard disc 15, the above-mentioned read command and the command indicating to read it from the DVD-ROM drive 14 may be simultaneously sent to the transfer interface 30.

Also, the present invention is not limited to the transferring process of FIG. 5 or the process of reading from the hard disc 15 of FIG. 9. For example, the transfer interface 30 may carry out the process of writing desirable data to the hard disc 15. In this case, the CPU 11 may send the write command signal to the transfer interface 30, and the command converter 32 may generate a command group corresponding to the write command signal. Accordingly, in the data flow opposite to that of FIG. 9, the desirable data is written through the inner bus 10, the transfer controller 31, the buffer RAM 34, the host side interface 35 and the disc side interface 42 to the hard disc 15.

Since the block map data is read from the hard disc 15 as shown in FIG. 9, the navigation operation can be continued even while the disc is ejected or when the DVD-ROM drive 14 is used for another purpose. At this time, if the block map data around the self-car position or on the optimal route is transferred to the hard disc 15, the block map data having a high usage worth can be selectively stored in the map data storage area 15a whose storage capacity is limited. Moreover, the usage of the hard disc 15 having the fast access speed enables the screen display or the scroll to be made faster, so that a comfortable navigation operation can be performed. Furthermore, the process of transferring the block map data and the process of reading the block map data can be shared through the transfer interface 30. Thus, it is possible to simplify the configuration and the process of the navigation system.

In the above embodiment, such a case that the DVD-ROM 1 is used as the record medium in which the map data is recorded is described. However, the record format to the record medium is not limited to the DVD format. It is possible to use the various memories having the interface matched with the host side interface 35.

The navigation system according to the embodiment is not limited to the case in which it is attained as the individual navigation apparatus. For example, it can be attained by the combination with a personal computer having a hard disc. In this case, the function of the embodiment can be attained by driving a software to carry out the transferring process of the present invention in the personal computer.

In the above described embodiment, the navigation system is equipped in a car. However, the present invention is not limited to this. For example, the navigation system of the present invention may be equipped in a movable body other than a car, or may be equipped in a portable electronic equipment such as a portable telephone, a mobile computer, a lap top computer or the like, which can be used for navigating a person who is walking. In other ward, the movable body as the target for the navigation operation may be a person using such a portable electronic equipment.

As mentioned above, according to the present embodiment, the transfer interface 30 transfers the map data recorded in the record medium e.g., the DVD-ROM 1, from the first memory device e.g., the DVD ROM drive 14, to the second memory device e.g., the hard disc 15, at the predetermined timing. Thus, the first memory device can be used for another purpose during the navigation. Hence, it is possible to provide the navigation system, which can effectively use the map data while carrying out the comfortable navigation without occupying the inner bus or without applying too much burden on the navigation controlling device e.g., the CPU 11, at the time of the transferring process.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-354864 filed on Dec. 14, 1999 including the specification, claims, drawings and summary is incorporated herein by reference in its entirety.

What is claimed is:

1. A navigation system comprising:
    a present position detecting device for detecting a present position;
    a first memory device for reading map data from a record medium in which the map data is recorded;
    a second memory device of non-volatile type, to which the map data can be written and from which the map data can be read;
    a navigation controlling device for controlling a navigation operation in correspondence with the detected present position by using the map data, and sending a transfer command to transfer the map data from said first memory device to said second memory device at a predetermined timing; and
    a transfer interface for controlling an operation of reading the map data from said record medium by said first memory device and an operation of transferring the map data to said second memory device, in accordance with the sent transfer command, wherein the operation of reading the map data from said record medium by said first memory device and the operation of transferring the map data to said second memory device are performed through an exclusive bus which is not utilized by said navigation controlling device, and wherein said transfer interface comprises: a command converting device for converting a type of the sent transfer command to thereby generate a command, which is identifiable by said first memory device and said second memory device; and a transfer controlling device for controlling the operation of transferring the map data from said first memory device to said second memory device, on the basis of the generated command.

2. A navigation system according to claim 1, wherein the map data read from said record medium by said first memory device is sent through said transfer interface to said second memory.

3. A navigation system according to claim 1, wherein said transfer interface further comprises a buffer memory device for transiently storing the map data, and said transfer controlling device controls the operation of transferring the map data from said first memory device to said buffer memory device and an operation of transferring the map data from said buffer memory device to said second memory device, on the basis of the generated command.

4. A navigation system according to claim 3, wherein said transfer interface further comprises an address generating device for generating an address for said transfer controlling device to access said buffer memory device.

5. A navigation system according to claim 1, wherein said transfer controlling device divides the map data into a plurality of unit data each comprising a predetermined unit data amount and transfers the map data by repeating an operation of transferring the unit data by a plurality of times.

6. A navigation system according to claim 5, wherein the predetermined unit data amount is substantially equal to a storage capacity of said buffer memory device.

7. A navigation system according to claim 1, wherein said command converting device generates a plurality of commands by converting a type of the sent transfer command.

8. A navigation system according to claim 1, wherein said transfer controlling device outputs a signal, which is to identify an end of the operation of transferring the map data, to said navigation controlling device.

9. A navigation system according to claim 1, wherein said second memory device is capable of writing and reading the map data at an access speed faster than that of said first memory device.

10. A navigation system according to claim 9, wherein said second memory device comprises a hard disc device.

11. A navigation system according to claim 1, wherein a plurality of block map data, which are obtained by dividing a whole map for each unit block, are recorded in said record medium, and said transfer interface reads the block map data and transfers the read block map data to said second memory device.

12. A navigation system according to claim 11, wherein said transfer interface further comprises a buffer memory device, which has a storage capacity capable of storing at least one block map data, for transiently storing the block map data.

13. A navigation system according to claim 11, wherein said navigation controlling device judges whether or not each block map data to be transferred is already stored in said second memory device, and controls said transfer interface to transfer the block map data which is not judged to be stored in said second memory device yet.

14. A navigation system according to claim 11, wherein said navigation controlling device controls said transfer interface to transfer a plurality of block map data corresponding to a plurality of peripheral unit blocks with respect to one unit block including the present position as a standard.

15. A navigation system according to claim 11, wherein said navigation controlling device controls said transfer interface to transfer a plurality of block map data corresponding to a plurality of unit blocks including an optimal route from the present position to a destination.

16. A navigation system according to claim 1, wherein said navigation controlling device controls said transfer interface to transfer the map data corresponding to a predetermined area defined in accordance with the detected present position.

17. A navigation system according to claim 1, wherein said navigation controlling device sends the transfer command each time when a movable body, the present position of which is detected, is moved for a predetermined distance.

18. A navigation system according to claim 1, wherein said navigation controlling device sends a read command to read the map data as the transfer command, and said transfer interface reads the map data from said first or second memory device in accordance with the sent read command.

19. A navigation system comprising:

a present position detecting device for detecting a present position;

a first memory device for reading map data from a record medium in which the map data is recorded;

a second memory device of non-volatile type, to which the map data can be written and from which the map data can be read;

a transfer interface for controlling an operation of reading the map data from said record medium by said first memory device or said second memory device, in accordance with a read command to read the map data; and a navigation controlling device for controlling a navigation operation in correspondence with the detected present position by using the map data, which is read under a control of said transfer interface, and sending the read command at a predetermined timing, wherein the operation of reading the map data from said record medium by said first memory device or said second memory device is performed through an exclusive bus which is not utilized by said navigation controlling device, and wherein said transfer interface comprises: a command converting device for converting a type of the sent read command to thereby generate a command, which is identifiable by said first memory device and said second memory device; and a transfer controlling device for controlling the operation of transferring the map data from said first memory device to said second memory device, on the basis of the generated command.

20. A navigation system according to claim 19, wherein the read command is appended with identification information, which identifies whether or not the map data is to be read from said record medium by said first memory device or said second memory device.

* * * * *